US012804749B2

(12) United States Patent
Hart et al.

(10) Patent No.: US 12,804,749 B2
(45) Date of Patent: Nov. 17, 2026

(54) DISTRIBUTED MULTI-LINK OPERATION AND JOINT TRANSMISSION FOR ENHANCED DIVERSITY AND RELIABILITY

(71) Applicant: Cisco Technology, Inc., San Jose, CA (US)

(72) Inventors: Brian Donald Hart, Sunnyvale, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 18/593,646

(22) Filed: Mar. 1, 2024

(65) Prior Publication Data

US 2024/0298372 A1 Sep. 5, 2024

Related U.S. Application Data

(60) Provisional application No. 63/487,778, filed on Mar. 1, 2023.

(51) Int. Cl.

| | |
|---|---|
| ***H04W 72/04*** | (2023.01) |
| ***H04W 28/06*** | (2009.01) |
| ***H04W 48/16*** | (2009.01) |
| ***H04W 76/15*** | (2018.01) |
| *H04W 84/12* | (2009.01) |

(52) U.S. Cl.

CPC ......... *H04W 76/15* (2018.02); *H04W 28/065* (2013.01); *H04W 48/16* (2013.01); *H04W 84/12* (2013.01)

(58) Field of Classification Search

CPC ...... H04L 47/34; H04L 69/14; H04W 28/065; H04W 48/16; H04W 76/15; H04W 84/12

See application file for complete search history.

(56) References Cited

U.S. PATENT DOCUMENTS

2019/0150214 A1* 5/2019 Zhou .................... H04W 76/15 370/329

2020/0021400 A1 1/2020 Cherian et al.

(Continued)

FOREIGN PATENT DOCUMENTS

AU 2024247436 A1 * 10/2025 ............ H04W 76/15

GB 2596870 A 1/2022

OTHER PUBLICATIONS

Hamilton (Ruckus / COMMSCOPE): "802.11be Ap Mld Architecture Discussion", IEEE 11-20-1639-r14, Piscataway, vol. 802.11 EHT, No. 14, Feb. 22, 2021, Retrieved on Feb. 23, 2021, XP068178824, pp. 1-43, Slides. 3-43.

(Continued)

*Primary Examiner* — Phuc H Tran

(74) *Attorney, Agent, or Firm* — Polsinelli P.C.

(57) ABSTRACT

Method, system, and/or computer readable medium for providing enhanced diversity and reliability for a continued wireless connection including: establishing an upper upper medium access controller (UMAC) and a plurality of lower UMACs; discovering the upper UMAC by each of the plurality of lower UMACs; connecting a station (STA) actor to each of the plurality of lower UMACs; connecting each of the plurality of lower UMACs to the upper UMAC; and establishing a connection through the upper UMAC and each of the plurality of lower UMACs to the STA actor.

19 Claims, 7 Drawing Sheets

(56) References Cited

U.S. PATENT DOCUMENTS

| | | | | |
|---|---|---|---|---|
| 2021/0160941 A1 | 5/2021 | Patil et al. | | |
| 2022/0110123 A1* | 4/2022 | Adachi | ............. | H04W 72/0453 |
| 2023/0090228 A1 | 3/2023 | Sekiya et al. | | |
| 2023/0254740 A1 | 8/2023 | Sedin et al. | | |
| 2023/0262803 A1 | 8/2023 | Mger et al. | | |
| 2023/0269805 A1 | 8/2023 | Patil et al. | | |
| 2023/0403741 A1* | 12/2023 | Xin | ................... | H04W 74/0816 |

OTHER PUBLICATIONS

Hart (Cisco Systems) B., et al., "Roaming Requirements", IEEE-SA Mentor, Piscataway, NJ USA, vol. 802.11 UHR, No. 1, May 15, 2023, Retrieved from https://mentor.ieee.org/802.11/dcn/23/11-23-0324-01-0uhr-roaming-requirements.pptx on May 15, 2023, pp. 1-15, XP068203219, doc.: IEEE 802.11-23/0324r1, Apr. 2023, Slide 7.

IEEE: "5. MAC service definition, 5.1 Overview of MAC services, 5.1.5 MAC data service architecture," IEEE P802.11be/D3.0, Piscataway, vol. 802.11be, Jan. 31, 2023, XP068196276, pp. 75-80, section 5.1.5 with subsections.

International Search Report and Written Opinion for International Application No. PCT/US2024/018247, dated Jul. 4, 2024, 17 Pages.

"IEEE P802.11be™/D1.4 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D1.4. Jan. 2022 (787 pages).

"IEEE P802.11be™/D1.5 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D1.5. Mar. 2022 (831 pages).

"IEEE P802.11be™/D1.6 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be™M/D1.6. May 2022 (887 pages).

"IEEE P802.11be™/D2.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.0. May 2022 (873 pages).

"IEEE P802.11be™/D2.1.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.1.1. Aug. 2022 (889 pages).

"IEEE P802.11be™/D2.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.1. Jul. 2022 (885 pages).

"IEEE P802.11be™/D2.2 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.2.Oct. 2022 (923 pages).

"IEEE P802.11be™/D2.3 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.3. Nov. 2022 (947 pages).

"IEEE P802.11be™/D3.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D3.0. Jan. 2023 (999 pages).

"IEEE P802.11be™/D3.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D3.1. Mar. 2023 (1005 pages).

"IEEE P802.11be™/D3.2 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D3.2. May 2023 (1055 pages).

"IEEE P802.11be™/D4.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D4.0. Jul. 2023 (1031 pages).

"IEEE P802.11be™/D4.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D4.1. Sep. 2023 (1045 pages).

"IEEE P802.11be™/D5.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D5.0. Nov. 2023 (1045 pages).

"IEEE P802.11be™/D5.01 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 2: Enhancements for extremely high throughput (EHT)". 802.11 Working Group of the

(56) References Cited

OTHER PUBLICATIONS

LAN/MAN Standards Committee of the IEEE Computer Society. IEEE P802.11be/D5.01. Mar. 2024 (1051 pages).
"IEEE P802.11be™/D5.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 2: Enhancements for extremely high throughput (EHT)". IEEE P802.11be/D5.1. Mar. 2024 (1051 pages).
"IEEE Standard for Information technology—Telecommunications and information exchange between systems Local and metropolitan area networks—Specific requirements: Part 11: Wireless LAN Medium Access Control (MAC) and Physical Layer (PHY) Specifications". IEEE Computer Society. Mar. 29, 2012 (2793 pages).
"IEEE Standard for Information technology—Telecommunications and information exchange between systems Local and metropolitan area networks—Specific requirements: Part 11: Wireless LAN Medium Access Control (MAC) and Physical Layer (PHY) Specifications". IEEE Computer Society. Dec. 7, 2016 (3534 pages).
"IEEE Standard for Information Technology—Telecommunications and Information Exchange between Systems Local and Metropolitan Area Networks—Specific Requirements: Part 11: Wireless LAN Medium Access Control (MAC) and Physical Layer (PHY) Specifications". IEEE Computer Society. Dec. 3, 2020 (4379 pages).
"IEEE Standard for Information technology—Telecommunications and information exchange between systems—Local and metropolitan area networks—Specific requirements: Part 11: Wireless LAN Medium Access Control (MAC) and Physical Layer (PHY) Specifications: Amendment 2: Fast Basic Service Set (BSS) Transition". IEEE Computer Society. Jul. 15, 2008 (126 pages).

* cited by examiner

DISTRIBUTED MULTI-LINK OPERATION AND JOINT TRANSMISSION FOR ENHANCED DIVERSITY AND RELIABILITY

CROSS-REFERENCE TO RELATED APPLICATION

This application claims benefit of and priority to U.S. Provisional Patent Application No. 63/487,778, filed Mar. 1, 2023, entitled "ASPECTS OF DISTRIBUTED MLO AND JOINT TRANSMISSION", the entire contents of which is incorporated herein by reference in its entirety.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards and amendments is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

The following description is directed to some particular examples for the purposes of describing innovative aspects of this disclosure. However, a person having ordinary skill in the art will readily recognize that the teachings herein may be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards and amendments.

According to at least one example, a method includes: establishing an initial traffic flow from a network to a station; splitting an existing upper medium access controller (UMAC), through which the initial traffic flow traverses, into an upper UMAC and one or more lower UMAC(s); establishing a connection through the upper UMAC and the one or more lower UMAC to the station.

An access point that includes a memory configured to store data, such as virtual content data, one or more images, etc. and one or more processors (e.g., implemented in circuitry) coupled to the memory and configured to execute instructions of the above described method. The present disclosure also includes a system having a storage (implemented in circuitry) configured to store instructions and a processor. The processor configured to execute the instructions and cause the processor to: establish an initial traffic flow from a network to a station; split an existing UMAC, through which the initial traffic flow traverses, into an upper UMAC and one or more lower UMAC(s); establish a connection through the upper UMAC and the one or more lower UMAC(s) to the station.

Additionally, a computer readable medium includes instructions using a computer system. The computer system includes a memory (e.g., implemented in circuitry) and a processor (or multiple processors) coupled to the memory. The processor (or processors) is configured to execute the computer readable medium and cause the processor to: establish an initial traffic flow from a network to a station; split an existing UMAC, through which the initial traffic flow traverses, into an upper UMAC and one or more lower UMAC(s); establish a connection through the upper UMAC and the one or more lower UMAC(s) to the station.

Figure 1:
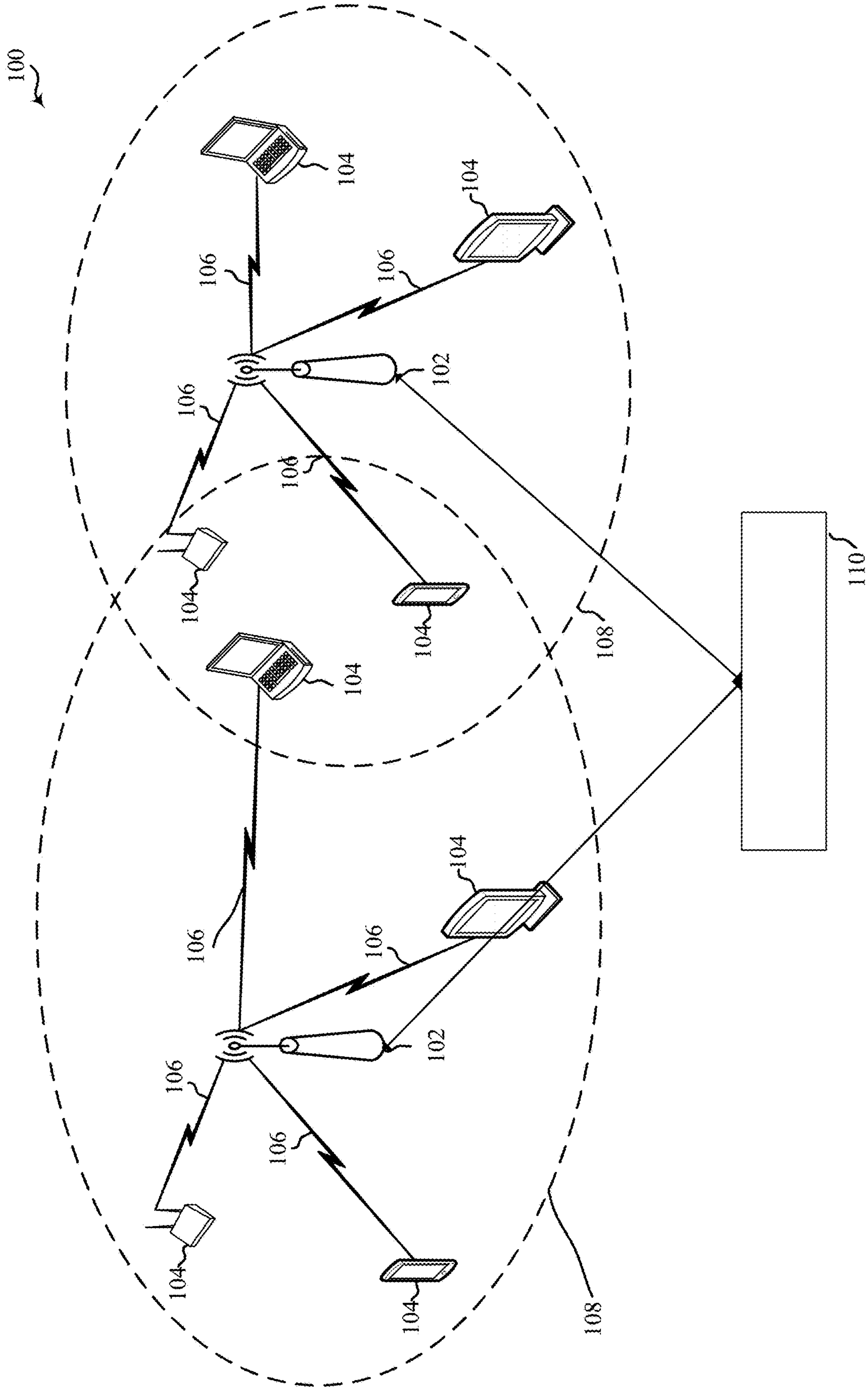
FIG. 1 shows a pictorial diagram of an example wireless communication network according to some aspects of the present technology.

FIG. 1 illustrates a block diagram of an example wireless communication network 100. According to some aspects, the wireless communication network 100 may be an example of a wireless local area network (WLAN) such as a Wi-Fi network (and will hereinafter be referred to as WLAN 100). For example, the WLAN 100 may be a network implementing at least one of the IEEE 802.11 family of wireless communication protocol standards and amendments thereof (such as that defined by the IEEE 802.11-2016 specification or amendments thereof including, but not limited to, 802.11ay, 802.11ax, 802.11az, 802.11ba and 802.11be). Additionally, the WLAN 100 may implement future versions and amendments of the wireless communication protocol standards and amendments thereof such as 802.11bn and be modified according to the present disclosure to include the features contained herein. The WLAN 100 may include numerous wireless communication devices such as an AP actor, which can be one or more of a non-MLD AP, an AP affiliated with an AP MLD, and/or an AP MLD. In the examples presented herein, the AP actor can exclude an upper UMAC. Therefore, the AP actor can include the lower UMAC, LMAC, and/or PHY. Additionally, the WLAN can include one or more STA actors 104, which can be one or more of a non-MLD STA, a STA affiliated with a non-AP MLD, and/or a non-AP MLD. As illustrated, the WLAN 100 also may include multiple AP actors 102. The multiple AP actors 102 can be coupled to one another through a switch 110. While the multiple AP actors 102 are shown as being coupled to one another through a switch 110, the network can provide another device that allows the coupling of the multiple AP actors.

Each of the STA actors 104 also may be referred to as a mobile station (MS), a mobile device, a mobile handset, a wireless handset, an access terminal (AT), a user equipment (UE), a subscriber station (SS), client, or a subscriber unit, among other examples. The STA actors 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples. In other examples, the STA actors 104 can be referred to as clients and/or client devices.

A single AP actor 102 and an associated set of STA actors 104 may be referred to as a basic service set (BSS), which is managed by the respective AP 102. FIG. 1 additionally shows an example coverage areas 108 of the associated AP 102, which may represent a basic service area (BSA) of the WLAN 100. As illustrated, three of the STA actors 104 are within the BSA of each of the AP actors 102. The BSS may be identified to users by a service set identifier (SSID), where the BSS might be one of many in the SSID. The BSS may be identified to other devices by a unique (or substantially unique) basic service set identifier (BSSID). The AP 102 periodically broadcasts beacon frames ("beacons") including the BSSID to enable STA actors 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons may include an identification of a primary channel used by the respective AP 102 as well as a timing synchronization function for establishing or maintaining timing synchronization with the AP 102. The AP 102 may provide communication links 106 to the various STA actors 104 and therefore access to external networks. While the example has been described in regards to an AP 102 and STA actors 104, the present disclosure extends such that an AP actor may provide access to external networks to various STA actors in a WLAN via respective communication links 106.

To establish a communication link 106 with an AP 102, each of the STA actors 104 is configured to perform passive or active scanning operations ("scans") on frequency channels in one or more frequency bands (for example, the 2.4 GHz, 5 GHz, 6 GHz or 60 GHz bands). To perform passive scanning, a STA actor 104 listens for beacons, which are transmitted by respective AP 102 at or near a periodic time referred to as the target beacon transmission time (TBTT) (measured in time units (TUs) where one TU may be equal to 1024 microseconds (μs)). To perform active scanning, a STA actor 104 generates and sequentially transmits probe requests on each channel to be scanned and listens for probe responses from AP 102. Each STA actor 104 may be configured to identify or select an AP and thence an AP 102 with which to associate based on the scanning information obtained through the passive or active scans, and to perform authentication and association operations to establish a communication link 106 with the selected AP 102. The AP 102 assigns an association identifier (AID) to the STA actor 104 at the culmination of the association operations, which the AP 102 uses to improve the efficiency of certain signalling to the STA actor 104.

The present disclosure modified the WLAN radio and baseband protocols for the PHY and medium access controller (MAC) layers. The AP 102 and STA actors 104 transmit and receive wireless communications (hereinafter also referred to as "Wi-Fi communications") to and from one another in the form of PHY protocol data units (PPDUs). The AP 102 and STA actors 104 also may be configured to communicate over other frequency bands such as shared licensed frequency bands, where multiple operators may have a license to operate in the same or overlapping frequency band or bands.

Each PPDU is a composite structure that includes a PHY preamble and a payload in the form of one or more PHY service data unit (PSDU). The information provided in the preamble may be used by a receiving device to decode the subsequent data in an intended PSDU. In instances in which PPDUs are transmitted over a bonded channel, selected preamble fields may be duplicated and transmitted in each of the multiple component channels.

Figure 2A:
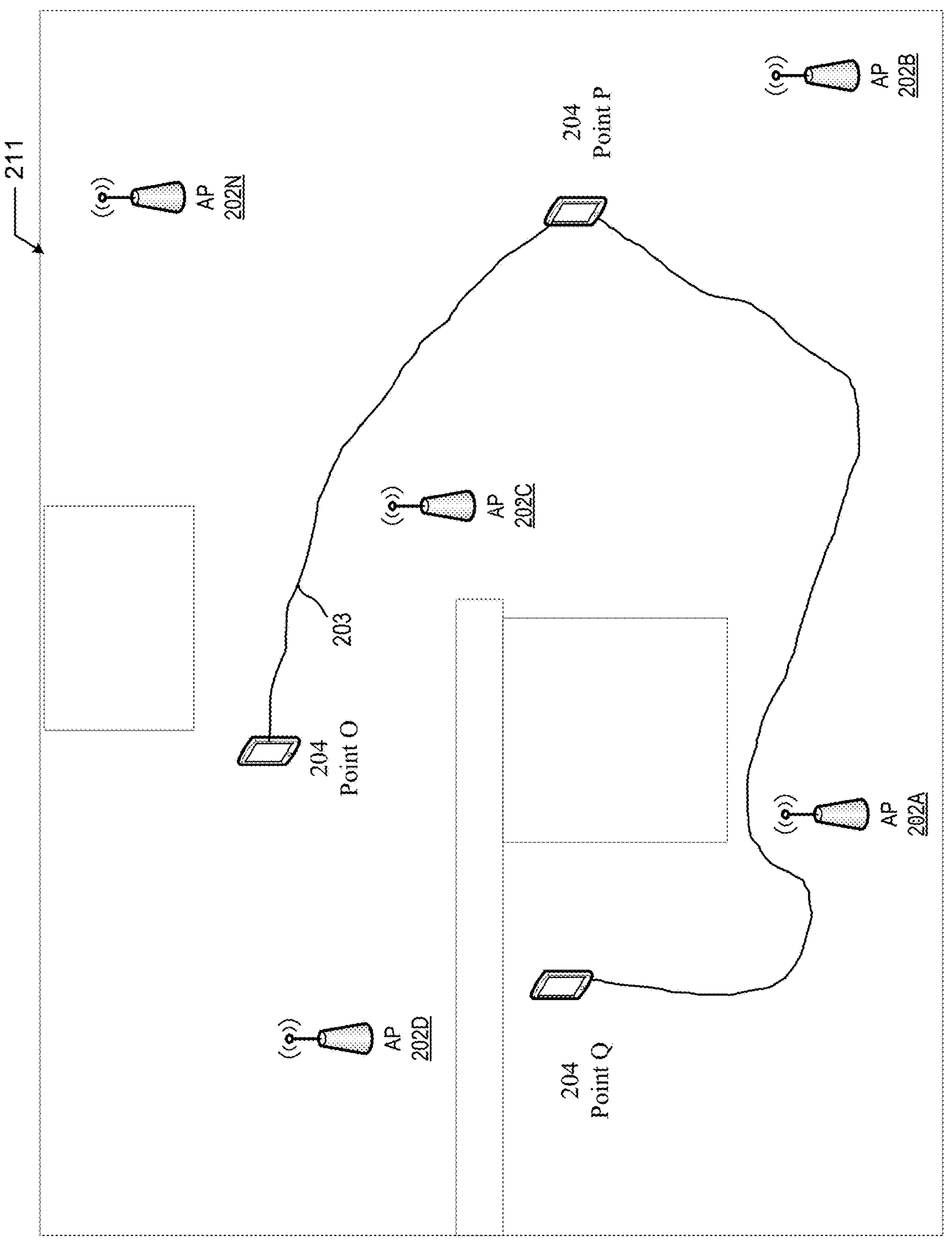
FIG. 2A illustrates an example of a wireless communication network spanning a single floor of a building.

FIG. 2A illustrates an example a single floor 211 of building. While only a single floor is illustrated a description equally applies to multiple floors in a building. Additionally, some of the floors in a building may not be contiguous, such that floors 1, 3, 4, and 8 span a network for a building that has floors 1-10. Thus, in at least one implementation the building can include one or more floors that do not have a network including one or more AP actors. As illustrated, the single floor 211 includes a plurality of AP actors 202A, 202B, 202C, 202D, 202N. Each of the AP actors 202A, 202B, 202C, 202D, 202N can have a respective coverage area such that an overall coverage area can span substantially the entire floor. In other examples, the overall coverage area can extend beyond the entire floor. In other examples, the overall coverage area can extend beyond the entire floor. Additionally, the coverage of one AP actor 202A, 202B, 202C, 202D, 202N may substantially overlap with the coverage of another of the AP actors 202A, 202B, 202C, 202D, 202N.

As illustrated by the line 203, STA actor 204 can move from point O to point P to point Q. When a STA actor 204 is moving around on a given floor, different AP actors 202A, 202B, 202C, 202D, 202N can be considered to be nearest to the STA actor 204. Nearest as used in relation to the AP actors 202A, 202B, 202C, 202D, 202N and STA actor 204 can include being physically nearest (for example, a Euclidean distance on the floor) and/or pathloss-nearest (for example, having the lowest wireless attenuation (pathloss) between AP actor, among all the AP actors, and STA actor). Additionally, the pathloss-nearest approach can be used to reduce the likelihood of connection between an AP actor on a floor above or below the STA actor 204. The location of the AP actor on the floor above or below might be closer in a Euclidean sense, but also not be a desirable AP for the connection of the device or station due to the floor location and/or possible signal interruption. The location of the AP actor on the floor above or below might be closer in a straight line and/or Euclidean sense, but also not be a desirable AP for the connection of the device or station due to the floor location and/or possible signal interruption. Additionally, the coverage of one or more AP actors can at least partially overlap with the coverage of one or more other AP actors. The present disclosure provides for selecting the AP actor and/or providing a communication pathway from one or more STA actors through one or more AP actors.

Figure 2B:
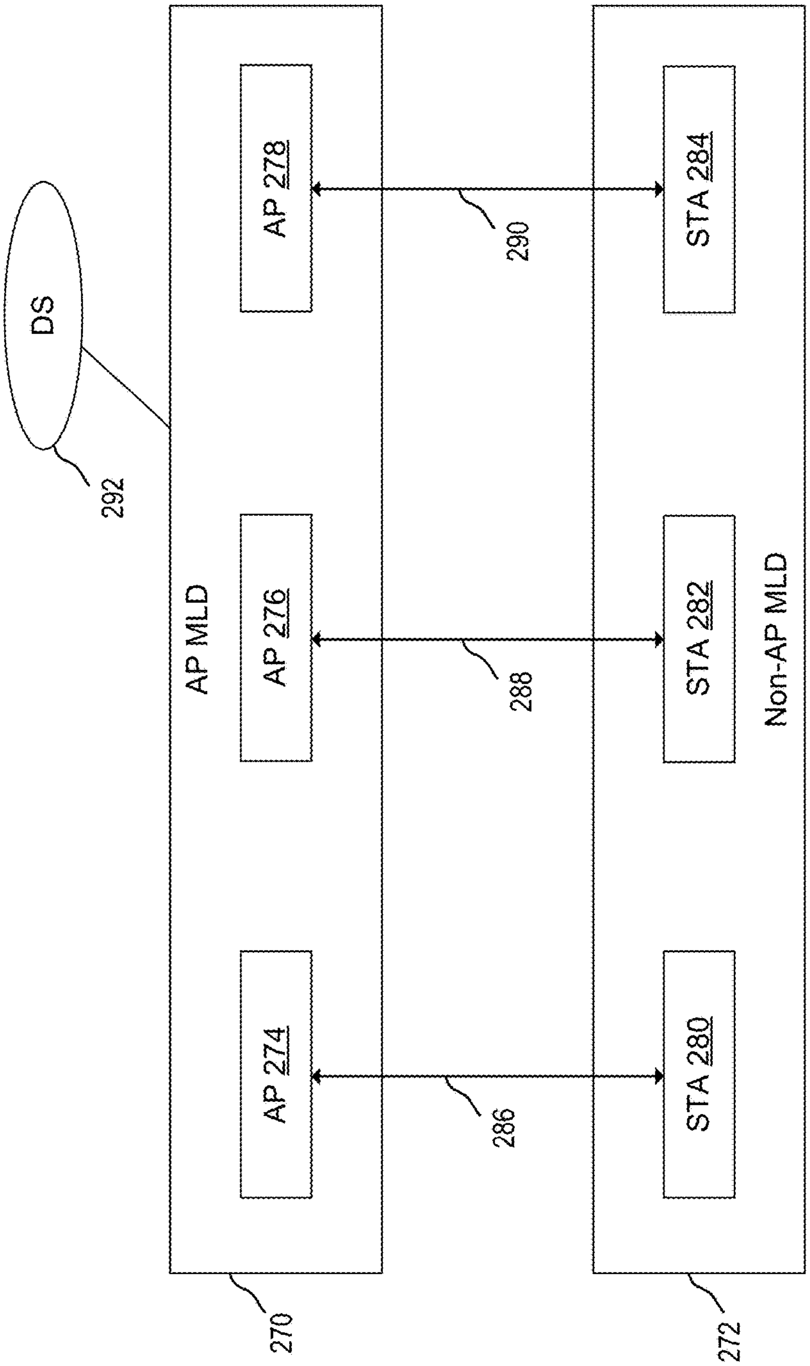
FIG. 2B depicts an illustrative schematic diagram for connectivity of an AP multi-link device (MLD) with multiple affiliated Aps to a non-AP MLD with multiple affiliated non-AP STAs according to some aspects of the present disclosure.

FIG. 2B depicts an illustrative schematic diagram for MLO between an AP MLD with affiliated logical entities and a non-AP MLD with affiliated logical entities according to some aspects of the present disclosure.

Referring to FIG. 2B, two multi-link logical entities AP MLD 270 and Non-AP MLD 272 are shown. AP MLD 270 may include physical and/or logical affiliated APs 274, 276, and 278 operating in different channels and typically different frequency bands (e.g., 2.4 GHz, 5 GHz, and 6 GHz). Affiliated APs 274, 276, and 278 may be the same as or similar to any one of the APs described above. Non-AP MLD 272 may include STAs 280, 282, and 284, which may be the same as or similar to any of the STAs as described herein.

Affiliated AP 274 may communicate with affiliated STA 280 via link 286. Affiliated AP 276 may communicate with affiliated STA 282 via link 288. Affiliated AP 278 may communicate with affiliated STA 284 via link 290.

AP MLD 270 is shown in FIG. 2B to have access to a distribution system (DS) 292, which is a system used to interconnect a set of BSSs to create an extended service set (ESS).

It should be understood that although the example shows three logical entities within the AP MLD and the three logical entities within the non-AP MLD, this is merely for illustration purposes and that other numbers of logical entities within each of the AP MLD and non-AP MLD may be envisioned. The example Wi-Fi systems and MLO described above with reference to FIGS. 1 and 2A-B provide examples of simplified and example systems of the present disclosure. Additional details of the present disclosure are provided in relation to FIGS. 3, 4A-B, and 5.

Figure 3:
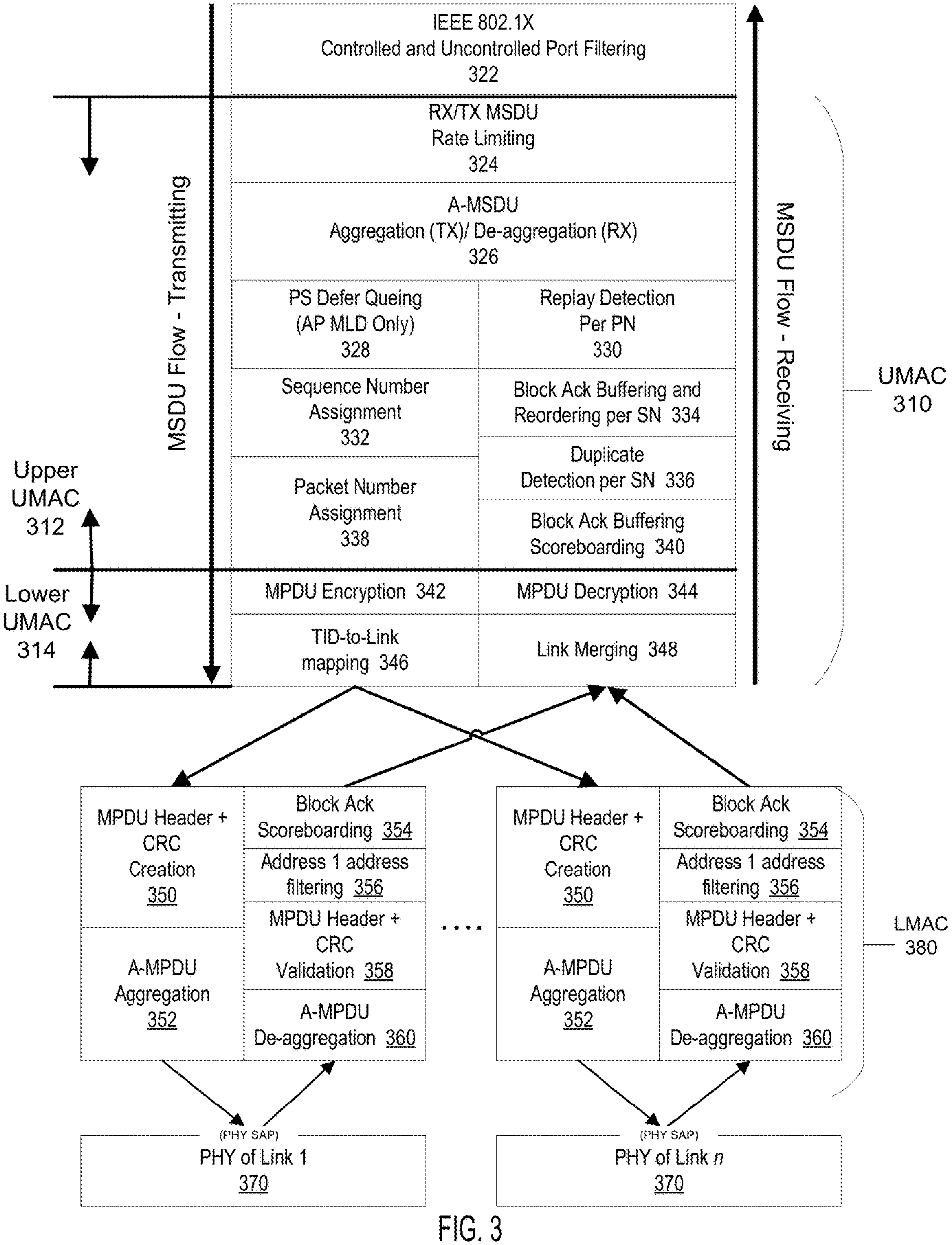
FIG. 3 illustrates an example block diagram of upper medium access controller (UMAC) being split into an upper UMAC and a lower UMAC, lower MACs (LMACs) and physical layers (PHYs)

FIG. 3 illustrates existing structure for UMAC 310, LMAC 380, the proposed splitting of the UMAC 310 into an upper UMAC 312 and one or more lower UMACs 314, and connectivity to the PHY. The UMAC 310 includes a MAC Service Data Unit (MSDU) flow for transmitting and a MSDU flow for receiving. The receiving flow is in the opposite direction of the transmitting. As illustrated, a UMAC 310 includes controlled and uncontrolled port filtering 322. The port filtering 322 may be in accordance with one of the IEEE 802.1X types of standards and amendments as described herein and those that might be agreed upon in the future. As illustrated, the UMAC 310 includes block for receiving/transmitting MSDU rate limited 324. Furthermore, the UMAC 310 includes an aggregate-MSDU (A-MSDU) function, which applies aggregation for transmitting and a receiving de-aggregation functions 326. Additionally, in at least one example with AP MLD as described above, a PS defer queuing 328 is included. In at least one example, a replay detection per PN 330 is optionally included. A sequence number assignment 332 may be included as well. A packet number assignment 338 may be included. Additionally, block acknowledgement (Block Ack or BA) buffering and reordering 334 may be performed per sequence number. Furthermore, the UMAC may include a duplicate detection per sequence number 336. Still further, the UMAC may include a Block Ack buffering scoreboarding 340 feature. Additionally, the UMAC may include MAC Protocol Data Unit (MPDU) encryption 342 and MPDU decryption 344. Still further, a traffic identifier (TID)-to-Link mapping function 346. Additionally, the UMAC 310 may include link merging 348.

As presented herein the UMAC 310 may be split into an upper UMAC 312 and one or more lower UMACs 314. The upper UMAC 312 can be located on a single AP or other network device and the one or more lower UMACs 314 can be collocated or otherwise within a corresponding LMAC 380. The lower UMAC 314 can contain substantially any function not associated with the upper UMAC 312. The upper UMAC 314 must contains the AMSDU aggregation and deaggregation functions 326, the sequence number (SN) assignment 332, packet number (PN) assignment 338, replay detection per PN 330, and BA buffering and reordering per SN 336. The upper UMAC can optionally include the RX/TX MSDU rate limiting 324 function, the PS defer queuing 328, the duplicate detection per SN 336, BA scoreboarding 340. The one or more lower UMACs 314 may each include any of the remaining functions of the UMAC 310. Thus, the one or more lower UMACs can include functions for include a MPDU decryption 344 and a MPDU encryption 342. Additionally, the one or more lower UMACs may each include a TID-to-Link mapping function 346 and a link merging 348, each of which may communicate with a respective LMAC 380 and thence PHY 370.

As illustrated, the one or more lower UMACs 314 communicates with a plurality of LMACs 380, which in turn communicate with corresponding PHYs 370. Each of the LMACs 380 may include a MPDU Header and cyclic redundant check (CRC) creation function 350. Furthermore, the LMACs 380 include an aggregate MPDU (A-MPDU) aggregation function 352. The path through which the data traverses on the way to the PHY 370 includes arriving from the TID-to-Link mapping function 346 of the one or more lower UMACs 314 and being received by the MPDU header and CRC creation function 350 and the A-MPDU aggregation function 352. Data that is received may likewise by received by the PHY 370 and then proceed through the LMAC 380. The received data from the PHY 370 of one of a number n links pass through the LMAC 380 by going through an A-MPDU aggregation function 360 and then a MPDU header and CRC validation function 358. The data proceeds to go through address 1 address filtering 356 before being passed through the Block Ack scoreboarding 354, which moves the data to the link merging 348 of the one or more lower UMACs 314.

Additionally, in at least one example, as the STA actor enters or is about to enter a roam point (RP), the upper UMAC remains in operation at an initial AP actor or a network element such as a wireless LAN controller, while the one or more lower UMACs can be added to provide the desired coverage. The one or more lower UMACs can be associated with different AP actors. Data can flow from the one or more lower UMACs of the more proximal AP actor(s) to the upper UMAC of the initial AP. Likewise data can flow from the upper UMAC of the initial AP actor to the one or more lower UMACs of the subsequent AP actor(s). The communication can be to all connected lower UMACs of each of the AP actors at substantially the same time, thereby multiple substantially simultaneous connectivity is provided. After a period of time, the initial one or more of the lower UMACs can stop communicating with the STA actor provided that a plurality of lower UMACs if continued communication is desired. Furthermore, after a period of time, the additional one or more lower UMACs, not heretofore described, can start communicating with the STA actor. Additionally, after a period of time, the initial upper UMAC in the initial device can be transitioned to an upper UMAC in a more proximal or less loaded subsequent device as well. In one or more examples, the upper UMAC can be located on a separate AP actor from the one or more lower UMACs. Additionally, the upper UMAC can be located on a separate network device that is not an AP actor. In at least one example, the upper UMAC can reside in a non-wireless device separate from each of the one or more lower UMACs.

In at least one example, the LMAC 380 and lower UMAC 314 can be collocated. In other examples, the functions of the LMAC 380 and lower UMAC 314 can be combined. Thus, there can be multiple lower UMACs 314. Additionally, as mentioned above, the lower UMAC 314 can have some of the functions that were described in regards to the UMAC 310 and upper UMAC 312 as well. Specifically those functions can include one or more of RX/TX SMDU rate limiting 324, PS defer queuing 328, duplicate detection per SN 336, BA buffering scoreboarding 340.

Figure 4A:
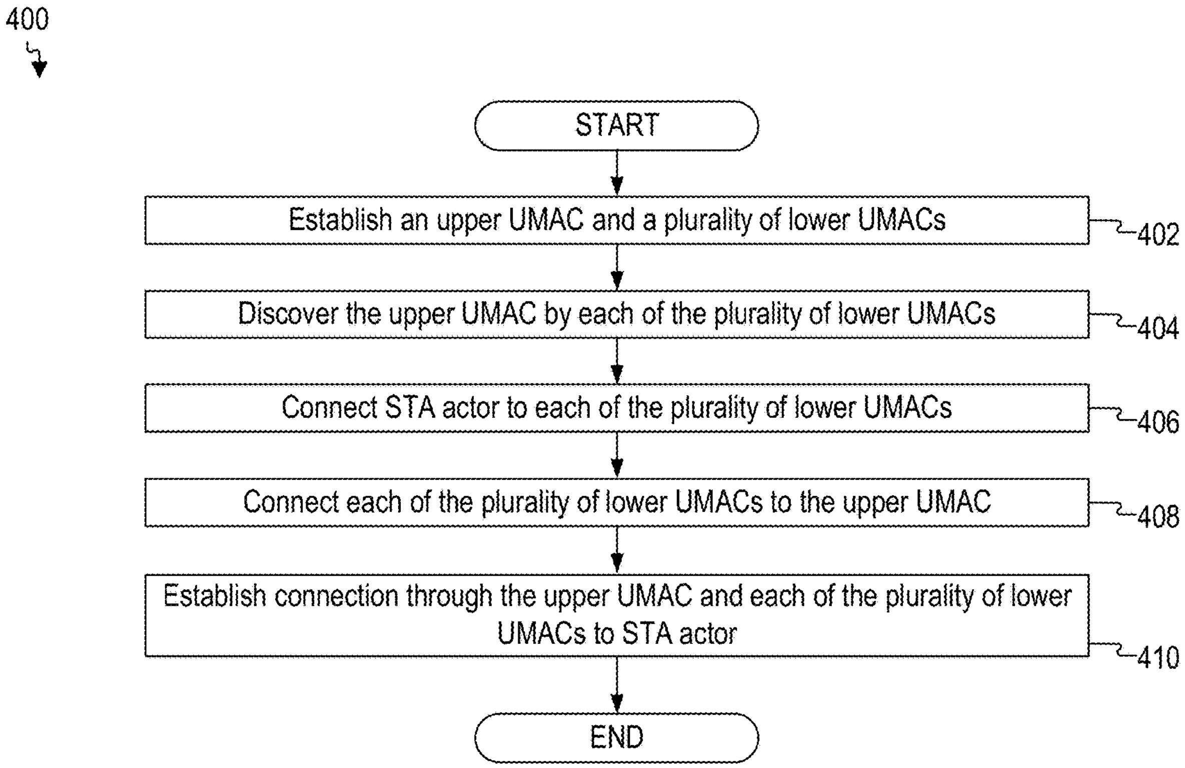
FIG. 4A illustrates an example routine for distributed multi-link operation and joint transmission in a wireless network according to some aspects of the present technology.
Figure 4B:
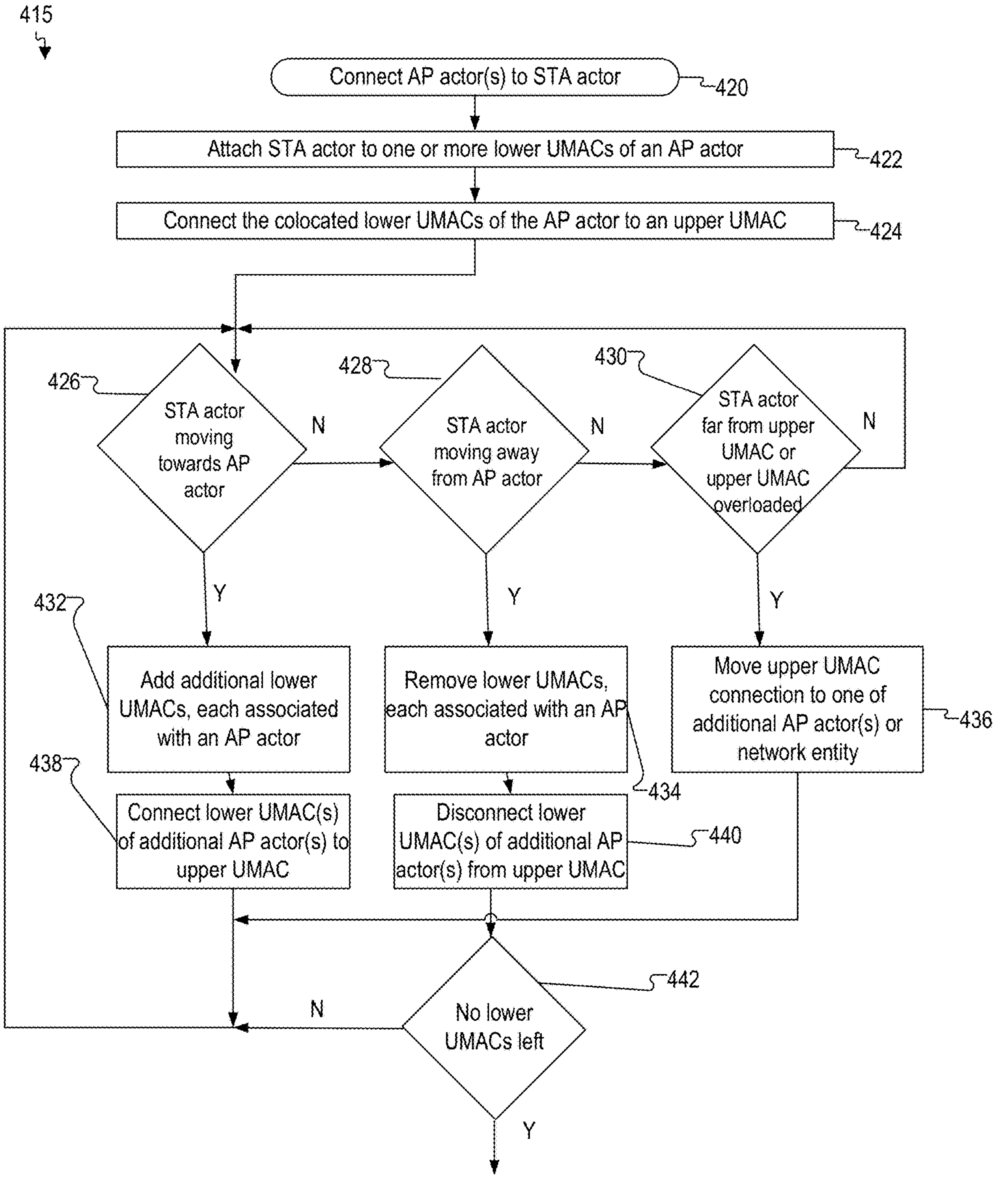
FIG. 4B illustrates an example routine for distributed multi-link operation and joint transmission in a wireless network according to some aspects of the present technology.

The process of creating a split architecture from a single UMAC to one upper UMAC and at least one lower UMAC is further described in relation to FIGS. 4A and 4B. Additionally, in at least one example, as the STA actor enters or is about to enter a roam point (RP), the upper UMAC remains in operation at an initial AP actor or a network element such as a wireless LAN controller, while the one or more lower UMACs(s) can be added to provide the desired coverage. The one or more lower UMAC(s) can be associated with different AP actors. Data can flow from the one or more lower UMAC(s) of the more proximal AP actor(s) to the upper UMAC of the initial AP. Likewise data can flow from the upper UMAC of the initial AP actor to the one or more lower UMAC(s) of the subsequent AP actor(s). The communication can be to all connected lower UMACs of each of the AP actors at substantially the same time, thereby multiple substantially simultaneous connectivity is provided. After a period of time, the initial one or more of the lower UMACs can stop communicating with the STA actor provided that a plurality of lower UMACs continue communication. Furthermore, after a period of time, the additional one or more lower UMAC(s), not heretofore described, can start communicating with the STA actor. Additionally, after a period of time, the initial upper UMAC in the initial device can be transitioned to an upper UMAC in a more proximal or less loaded subsequent device as well. In one or more examples, the upper UMAC can be located on a separate AP actor from the one or more lower UMAC(s). Additionally, the upper UMAC can be located on a separate network device that is not an AP actor. In at least one example, the upper UMAC can reside in a non-wireless device separate from each of the one or more lower UMAC(s).

FIGS. 4A-4B describe a process that supports providing enhanced diversity and reliability for continued wireless connection according to some implementations. The operations of the process can be implemented on one or more AP actors and zero or more additional network elements that provide connection to a STA actor. The flow charts of FIGS. 4A-4B can be combined with one another, but are illustrated separately to describe features of the present disclosure for completeness and clarity. Furthermore, portions of the flow charts can be omitted as well as additional steps/processes included according to the presently disclosed features. FIG. 4A shows a flowchart illustrating an example method 400 that supports providing enhanced diversity and reliability for a continued wireless connection according to some implementations. The operations of the method 400 may be implemented by an AP actor or its components as described herein. For example, the method 400 may be implemented such that the upper UMAC can reside in a non-wireless device that is separate and apart from all lower UMACs. Additionally, the non-wireless device is separate and apart from LMACs and PHYs. The lower UMACs, LMACs, and PHYs can be associated with one or more AP actors.

According to some examples, the method 400 includes establishing an upper UMAC and a plurality of lower UMACs at block 402. For example, the AP actor can include at least one of the plurality of lower UMACs. The upper UMAC can be located on a non-wireless device within the network. While a plurality of lower UMACs are described in relation to FIGS. 4A and 4B, the number of lower UMACs can be one or more.

According to some examples, the method 400 includes discovering the upper UMAC by each of the plurality of lower UMACs at block 404. For example, the AP 102 illustrated in FIG. 1 may be associated with one or more of the plurality of lower UMACs, which discover the upper UMAC on a non-wireless device.

According to some examples, the method 400 includes connecting a STA actor to each of the plurality of lower UMACs at block 406. For example, each of the STAs of FIG. 1 can connect to the plurality of lower UMACs. Additionally, as described in FIG. 3, each of the one or more lower UMAC(s) can establish a data flow through a LMAC, which communicates with a respective PHY. Each of the lower UMACs can communicate to a respective LMAC. The respectively LMAC can communicate to a respective PHY.

According to some examples, the method 400 includes connecting each of the plurality of lower UMACs to the upper UMAC at block 408.

Additionally, the method 400 includes establishing a connection through the upper UMAC and each of plurality of lower UMACs to a STA actor so that communication can flow from a network to the STA actor at block 410. Additionally, the data flow can be in the reverse direction. The present disclosure has an advantage in that a plurality of lower UMACs can be connected to the STA actor at the same time providing redundancy and preventing data interruption. The data can flow to and from the network through the upper UMAC.

FIG. 4B provides additional details regarding the flow of data in regards to the upper UMAC and lower UMAC as described in relation to FIG. 4A. As indicated, the method 415 begins with connecting an AP actor to a STA actor at block 420. The method 415 can also attach a STA actor to a lower UMAC at block 422. Additionally, the attachment of the STA actor to a plurality of lower UMACs can include synchronizing with other lower UMACs that are already connected or being connected at substantially the same time to the STA actor. In other examples, the initial connection is just with a single lower UMAC and further attachments can be made as described below.

The method 415 connects the one or more collocated lower UMACs of the AP actor to an upper UMAC at block 424.

The method 415 determines if the STA actor is moving towards an AP actor at block 426. If the method 415 determines that the STA actor is moving towards the AP actor, the method 415 adds additional lower UMACs, each of which is associated with an AP actor at block 432. The method 415 can connect one or more lower UMACs of additional one or more AP actors to the upper UMAC at block 438. The method 415 can repeat these processes to again determine if the STA actor is moving towards one or more AP actors.

If the method 415 determines that the STA actor is not moving towards one or more AP actors, the method 415 can determine if the STA actor is moving away from one or more AP actors at block 428. If the method 415 determines that the STA actor is moving away from the AP actor at block 428, the method 415 can make a determination if the STA actor is far from the upper UMAC or that the upper UMAC is overloaded. If the determination is that the STA actor is not far from the upper UMAC and that the upper UMAC is not overloaded at block 430, the method can proceed back to the determination process of block 426.

If a determination is made that either the STA actor is far from the upper UMAC or the upper UMAC is overloaded at block 430, then the method 415 can move the upper UMAC connection to one of an additional AP actor/actors or another network entity at block 436. The method 415 can then proceed to block 426.

If the method 415 determines that the STA actor is moving away from the one or more AP actors, the method 415 can remove lower UMACs associated with one or more of the AP actors that the STA actor is moving away from at block 434. Once the lower UMACs are removed from communication with the STA actor, the method can also disconnect the respective lower UMACs from the upper UMAC at block 440. The method 415 can proceed to determine if no lower UMACs remain connected to the STA actor at block 442. If no lower UMACs remain, then the method can proceed to repeat the process starting with determining if the STA actor is moving towards an AP actor at block 426.

Once the connection is made by a plurality of lower UMACs either on the AP actor or the additional AP actors a synchronized state between all of the connected lower UMACs is instituted. The state of the lower UMAC that may be synchronized includes transmit (TX) queue, TX BA queue, TX scoreboard, TX BA scoreboard, receive (RX) BA scoreboard, RX scoreboard, and/or RX reorder buffer as described below.

In at least one example, the TX and/or TX BA queue cannot be directly synchronized. The upper UMAC delivers each MPDU to each lower UMAC that is serving the STA actor and the lower UMAC adds the MPDU received from the upper UMAC to its TX and/or TX BA queue. The lower UMAC can retire an MPDU's state in the TX and/or TX BA queue after one or more of: MSDU expiry limit (which can be for each MSDU in the MPDU or the latest expiry time among all the MSDUs) is reached, a BA directly from STA actor indicating success, a BA (or similar, such as an indication of which MPDUs were received successfully including as a MPDU bitmap plus a Starting Sequence Number (SSN) from a peer lower UMAC, and/or a BA directly from the STA actor indicating that the STA achieved success. A peer lower UMAC refers to a lower UMAC in another AP actor that is also substantially simultaneously connected to the STA actor.

Synchronization of the TX and/or TX BA scoreboard can include options that allow for one or more of: minimizing TX and/or TX BA queue size by retiring successfully sent MPDUs quickly and/or minimizing duplicate transmissions from peer lower UMACs to the STA actor. For example, each lower UMAC can forward at a trigger its current SSN and MPDU bitmap to peer lower UMACs. The trigger can be event based, in response to a predetermined number of events, at fixed intervals, at adjustable intervals, and/or otherwise user configurable. In another example, the STA actor sends a BA that reflect MPDUs delivered by substantially all AP actors. In another example, the STA actor BA is operable to reflect MPDUs delivered by any and all AP actors. One of the AP actors sends a BA Request (BAR) at the start of the TX operation (TXOP) to determine what MPDUs are outstanding and the STA actor reports all that it has received. Additionally, the upper UMAC can be collocated with one lower UMAC, and thereby connected with lowest latency such that it can assume it is the first to attempt sending an MPDU to the STA actor and thereby omit sending the BAR+BA at the TXOP start; yet meanwhile the other lower UMACs can begin their TXOPs with a leading BAR+BA. In yet another example, the network collocates the upper UMAC with the AP actors, and distributes the upper UMACs for the STA actors across the AP actors to prevent a concentration of STA actors being provided with network connectivity at any one upper UMAC.

The RX BA scoreboard at each lower UMAC can be left in an unsynchronized state between the plurality of lower UMACs. For example, one of the lower UMACs can send a BA bitmap according to information known at the AP actor of the lower UMAC and the STA actor merges BA bitmaps received from each AP actor. The STA actor can try and retry an uplink (UL) MPDU at one or more of the AP actors until one of: the UL MPDU is successful and/or the expiry limit of all MSDUs in the MPDU is reached so that the entire MPDU is expired.

The upper UMAC can be described as an initial or current UMAC. The initial or current UMAC can be located on an initial/current AP or an initial/current network entity, which can be a wireless or non-wireless network entity. The additional lower UMACs can be synchronized and in communication with the STA actor including one or more features described herein.

Additionally, the method may also include synchronizing data of the plurality of lower UMACs over a wired connection. In other examples, the synchronization of data may be made over a wireless connection. The implementation of a wireless connection allows for communication to take place to establish a connection between the lower UMACs even if the wired connection does not permit the connection. The implementation of a wired connection allows for communication to take place to establish a connection between the lower UMACs even if the wireless connection does not permit the connection or if it would be an inefficient use of the wireless resources to select wireless communication. The wired connection may permit the selection of the N lower UMAC(s) that is/are most proximal to the station. The upper UMAC may also be established based upon proximity to the one the N lower UMAC(s) and thence the station.

Furthermore, the method may include reviewing the TX and/or RX scoreboards within the upper UMAC to determine the state of the synchronization of data. Additionally, the method may include reviewing the TX and/or RX BA scoreboards within the upper UMAC to determine the state of the synchronization of data. The ultimate BA scoreboards are logically part of the upper UMAC as illustrated in FIG. 3 above, but partial copies may exist at the lower UMACs as described above, and a TX BA scoreboard might be omitted at the upper UMAC. An RX BA scoreboard at the upper UMAC, which merges the RX BA scoreboards from the lower UMACs is highly desirable as part of determining which MPDUs and the MSDUs therein can be released to subsequent processing. Additionally, BA scoreboards across the system provide data regarding the success of the multiple lower UMACs and the BAR+BA and sync policies used at each, such data can be used to optimize the behavior of the synchronization functions including the sending of BARs and the BAs in response thereto. Thus, the state of the synchronization of data may be monitored and optimized. The scoreboarding further allows for a determination that a successful communication is occurring over the UMAC through the lower UMAC and upper UMAC split.

In at least one example, the one or more lower UMAC(s) can be configured such that there is a first lower UMAC and others of the one or more lower UMAC(s) are duplicates of the first lower UMAC. Additionally, the splitting of the UMAC also creates a duplication of the LMAC and PHY for each of the lower UMAC(s) that are created. The removal and/or detachment of the lower UMAC(s) is performed for non-final lower UMAC(s) that is/are communicatively coupled to the STA actor. The removal and/or detachment of the lower UMAC(s) proceeds after a final synchronization of each of the lower UMAC(s) (to be removed and/or detached) with the other lower UMACs and/or the upper UMAC. The process can include one or more of stopping synchronization with other lower UMACs, pushing final counters to the upper UMAC, and deleting everything on the lower UMAC (to be removed and/or detached). In at least one or more examples additional lower UMACs can be added before and/or after removal of the lower UMAC(s) that has been/will be removed and/or detached. The reattachment or addition of a lower UMAC provides for sending and receiving of MPDUs to/from a different lower UMAC and its lower MAC(s) and PHY(s) to the STA actor, while maintaining state and continued synchronization between the plurality of lower UMACs and the upper UMAC.

According to some examples, the method may also include selecting one of the plurality of upper UMACs based on which is nearest (physical and/or pathloss) to the STA actor. Additionally, the method can include distributing traffic from each of the plurality of lower UMACs across one or more additional upper UMACs. In one example, the distribution can include establishing a connection between one or more AP actors to minimize latency between AP actors when transferring transmit BAs.

In at least one examples, the method may include synchronizing a plurality of TX BA Scoreboards and related state at lower UMACs through a race between a lower UMAC to a lower UMAC communication path or a BAR and BA exchange with the STA. The race between the lower UMAC communication path and the BAR and BA exchange allows for the first communication path to provide data that assists with the establishment of the second one, thereby increasing the synchronization of the plurality of lower UMACs.

Additionally, a plurality of additional upper UMACs may be provided within the present disclosure. The method distributes a plurality of STAs across the additional upper UMACs and the proximal upper UAMC to provide for a distribution of the plurality of STAs.

The method can also include a flow control operation. The flow control operation prevents the upper UMAC from loading the plurality of lower UMACs with MPDUs that are not able to be delivered (for example, the STA actor is sleeping, dozing, or disconnected) on all of the links with the lower UMAC. In one example, each of the plurality of lower UMACs can send back the TX BA scoreboard for each TID on a predetermined basis (by time, or by event such as every M MPDUs received from the upper UMAC) to the upper UMAC. If the count of undelivered MPDUs is high or low in the TX BA scoreboard, the data can be turned off or on from the upper UMAC, respectively. Other measurements can be implemented such as reporting the number of outstanding MPDUs or a simple indication such as "resume sending/stop sending".

Figure 5:
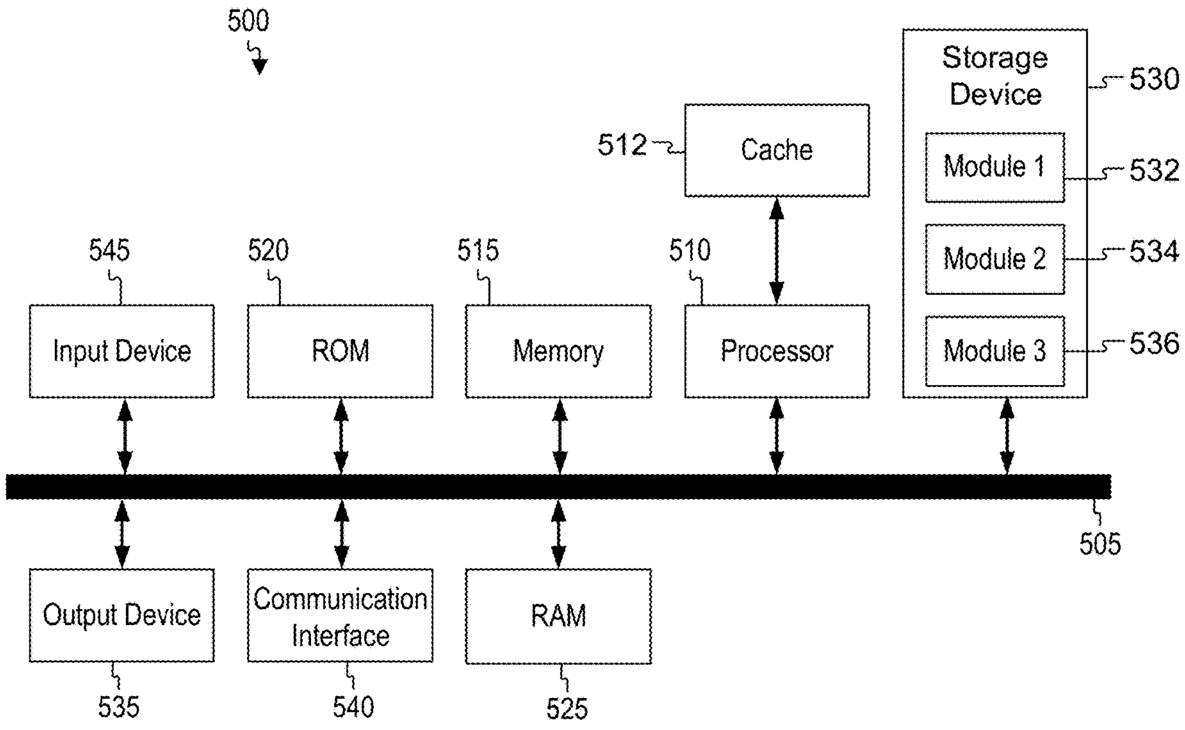
FIG. 5 shows an example of computing system, which may be for example any computing device that may implement components of the system.

FIG. 5 shows an example of computing system 500, which may be for example any computing device making up an AP, STA, or any component thereof in which the components of the system are in communication with each other using connection 505. Connection 505 may be a physical connection via a bus, or a direct connection into processor 510, such as in a chipset architecture. Connection 505 may also be a virtual connection, networked connection, or logical connection.

In some embodiments computing system 500 is a distributed system in which the functions described in this disclosure may be distributed within a datacenter, multiple datacenters, a peer network, etc. In some embodiments, one or more of the described system components represents many such components each performing some or all of the function for which the component is described. In some embodiments, the components may be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 may include a cache of high-speed memory 512 connected directly with, in close proximity to, or integrated as part of processor 510.

Processor 510 may include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which may represent any number of input mechanisms, such as a microphone for speech, a touch-sensitive screen for gesture or graphical input, keyboard, mouse, motion input, speech, etc. Computing system 500 may also include output device 535, which may be one or more of a number of output mechanisms known to those of skill in the art. In some instances, multimodal systems may enable a user to provide multiple types of input/output to communicate with computing system 500. Computing system 500 may include communications interface 540, which may generally govern and manage the user input and system output. There is no restriction on operating on any particular hardware arrangement and therefore the basic features here may easily be substituted for improved hardware or firmware arrangements as they are developed.

Storage device 530 may be a non-volatile memory device and may be a hard disk or other types of computer readable media which may store data that are accessible by a computer, such as magnetic cassettes, flash memory cards, solid state memory devices, digital versatile disks, cartridges, random access memories (RAMs), read only memory (ROM), and/or some combination of these devices.

The storage device 530 may include software services, servers, services, etc., that when the code that defines such software is executed by the processor 510, it causes the system to perform a function. In some embodiments, a hardware service that performs a particular function may include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a STA device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

Aspect 1. A method of providing enhanced diversity and reliability for a continued wireless connection, the method comprising: establishing an upper upper medium access controller (UMAC) and a plurality of lower UMACs; discovering the upper UMAC by each of the plurality of lower UMACs; connecting a station (STA) actor to each of the plurality of lower UMACs; connecting each of the plurality of lower UMACs to the upper UMAC; and establishing a connection through the upper UMAC and each of the plurality of lower UMACs to the STA actor.

Aspect 2. The method of Aspect 1, wherein the connection through the upper UMAC and each of the plurality of lower UMACs occurs at one or more overlapping times.

Aspect 3. The method of Aspect 2, further comprising selecting the plurality of lower UMACs based on physical and/or pathloss proximity to the station.

Aspect 4. The method of any one of Aspects 2-3, further comprising removing the connection to an existing upper UMAC and replacing the upper UMAC connection by a connection to another upper UMAC.

Aspect 5. The method of any one of Aspects 2-4, further comprising synchronizing data of the plurality of lower UMACs over a wired connection.

Aspect 6. The method of Aspect 5, further comprising reviewing block acknowledgement scoreboards to determine a state of the synchronization of data.

Aspect 7. The method of any one of Aspects 1-6, further comprising synchronizing the plurality of lower UMACs through a race between a lower UMAC to lower UMAC communication path or a block ack request and block ack exchange with the station.

Aspect 8. The method of any one of Aspects 1-7, wherein each of the plurality of lower UMACs can add medium access controller (MAC) Protocol Data Units (MPDUs) received from the upper UMAC to a transmit queue.

Aspect 9. The method of any one of Aspects 1-8, wherein each of the plurality of lower UMACs can retire a medium access controller (MAC) Protocol Data Units (MPDUs) state in a transmit queue after one or more of: a) MAC Service Data Unit expiry limit is reached; b) block acknowledgement directly from client indicating success; c) starting sequence number (SSN) and MPDU bitmap via a peer lower UMAC that indicates success; and/or d) block acknowledgement from client indicating a peer lower UMAC achieved success.

Aspect 10. The method of any one of Aspects 1-9, wherein each of the plurality of lower UMACs at a trigger forward a current starting sequence number (SSN) and MPDU bitmap to peer lower UMACs.

Aspect 11. The method of any one of Aspects 1-10, wherein STA actor sends a block acknowledgement that reflects medium access controller (MAC) Protocol Data Units (MPDUs) delivered by substantially all AP actors.

Aspect 12. The method of Aspect 11, further comprising sending uplink traffic received from the STA actor at the lower UMACs to the upper UMAC.

Aspect 13. The method of Aspect 12, further comprising establishing a connection between one or more lower UMACs to minimize latency between APs when transferring transmit block acknowledgements.

Aspect 14. The method of any one of Aspects 1-13, further comprising distributing state from each of the plurality lower UMACs to one or more additional lower UMACs through the upper UMAC.

Aspect 15. The method of any one of Aspects 1-14, wherein each of the plurality of lower UMACs send a transmit block acknowledgment scoreboard at a trigger to the upper UMAC, whereby the upper UMAC transmits the block acknowledgement scoreboard to others of the plurality of lower UMACs.

Aspect 16. The method of any one of Aspects 1-15, wherein each of the plurality of lower UMACs send a transmit block acknowledgement to all others of the plurality of lower UMACs for merging and determining what the STA actor has received.

Aspect 17. The method of any one of Aspects 1-16, further comprising receiving a retry uplink medium access controller (MAC) Protocol Data Unit (MPDU) from the STA at one or more lower UMACs multi-link devices until the uplink MPDU is successful or a MPDU expiry limit is reached.

Aspect 18. The method of any one of Aspects 1-17, further comprising a plurality of additional upper UMACs and distributing a plurality of stations across the additional upper UMACs and proximal upper UMAC to provide for a distribution of the plurality of stations.

Aspect 19. The method of any one of Aspects 1-18, further comprising receiving at a reorder buffer on the upper UMAC one or more uplinks from the plurality of lower UMACs and transmitting the uplinks from the reorder buffer.

Aspect 20. The method of any one of Aspects 1-19, wherein the upper UMAC is located on an AP actor and the plurality of lower UMACs are located a plurality of AP actors.

Aspect 21. The method of Aspect 19, wherein the AP actor with the upper UMAC includes a lower UMAC.

Aspect 22. The method of Aspect 20, wherein the plurality of AP actors with the lower UMACs do not include the AP actor with the upper UMAC.

Aspect 23. A system comprising: a storage configured to store instructions;

a processor configured to execute the instructions and cause the processor to: execute instructions according to Aspects 1 to 21.

Aspect 24. A non-transitory computer readable medium comprising instructions, the instructions, when executed by a computing system, cause the computing system to: execute instructions according to Aspects 1 to 21.

What is claimed is:

1. A method of providing enhanced diversity and reliability for a continued wireless connection, the method comprising:

establishing an upper upper medium access controller (UMAC) and a plurality of lower UMACs;

discovering the upper UMAC by each of the plurality of lower UMACs;

connecting a station (STA) actor to each of the plurality of lower UMACs;

connecting each of the plurality of lower UMACs to the upper UMAC;

establishing a connection through the upper UMAC and each of the plurality of lower UMACs to the STA actor; and wherein each of the plurality of lower UMACs can retire MAC Protocol Data Units (MPDUs) from a transmit queue after one or more of: (a) a MAC Service Data Unit expiry limit is reached; (b) a block acknowledgement received directly from the STA actor indicates success; or (c) a starting sequence number (SSN) and MPDU bitmap received via another lower UMAC of the plurality of lower UMACs indicates success.

2. The method of claim 1, wherein the connection through the upper UMAC and each of the plurality of lower UMACs occurs at one or more overlapping times.

3. The method of claim 2, further comprising selecting the plurality of lower UMACs based on physical and/or pathloss proximity to the station.

4. The method of claim 2, further comprising disconnecting a connection between the plurality of lower UMACs and the upper UMAC and establishing a connection between the plurality of lower UMACs and another upper UMAC.

5. The method of claim 4, further comprising synchronizing the plurality of lower UMACs through a race between a lower UMAC to lower UMAC communication path or a block acknowledgement request and block acknowledgement exchange with the station.

6. The method of claim 2, further comprising synchronizing data of the plurality of lower UMACs over a wired connection.

7. The method of claim 6, further comprising reviewing block acknowledgement scoreboard to determine a state of the synchronization of data.

8. The method of claim 1, wherein each of the plurality of lower UMACs can add medium access controller (MAC) Protocol Data Units (MPDUs) received from the upper UMAC to a transmit queue.

9. The method of claim 1, wherein each of the plurality of lower UMACs at a trigger forward a current starting sequence number (SSN) and MPDU bitmap to peer lower UMACs.

10. The method of claim 1, wherein STA actor sends a block acknowledgement that reflects medium access controller (MAC) Protocol Data Units (MPDUs) delivered by substantially all AP actors of a plurality of access point (AP) actors associated with the plurality of lower UMACs.

11. The method of claim 10, further comprising sending uplink traffic received from the STA actor at the lower UMACs to the upper UMAC.

12. The method of claim 11, further comprising establishing a connection between one or more lower UMACs to minimize latency between APs when transferring transmit block acknowledgements.

13. The method of claim 1, further comprising distributing state from each of the plurality lower UMACs to one or more additional lower UMACs through the upper UMAC.

14. The method of claim 1, wherein each of the plurality of lower UMACs send a transmit block acknowledgement scoreboard at a trigger to the upper UMAC, whereby the upper UMAC transmits the block acknowledgement scoreboard to others of the plurality of lower UMACs.

15. The method of claim 1, wherein each of the plurality of lower UMACs send a transmit block acknowledgement to all others of the plurality of lower UMACs for merging and determining what the STA actor has received.

16. The method of claim 1, further comprising a plurality of additional upper UMACs and distributing a plurality of stations across the additional upper UMACs and proximal upper UMAC to provide for a distribution of the plurality of stations.

17. The method of claim 1, further comprising receiving a reorder buffer on the upper UMAC one or more uplinks from the plurality of lower UMACs and transmitting the uplinks from the reorder buffer.

18. A system comprising:

a storage configured to store instructions;

a processor configured to execute the instructions and cause the processor to:

establish an upper upper medium access controller (UMAC) and a plurality of lower UMACs;

discover the upper UMAC by each of the plurality of lower UMACs;

connect a station (STA) actor to each of the plurality of lower UMACs;

connect each of the plurality of lower UMACs to the upper UMAC; and establish a connection through the upper UMAC and each of the plurality of lower UMACs to the STA actor; and wherein each of the plurality of lower UMACs can retire MAC Protocol Data Units (MPDUs) from a transmit queue after one or more of: (a) a MAC Service Data Unit expiry limit is reached; (b) a block acknowledgement received directly from the STA actor indicates success; or (c) a starting sequence number (SSN) and MPDU bitmap received via another lower UMAC of the plurality of lower UMACs indicates success.

19. A non-transitory computer readable medium comprising instructions, the instructions, when executed by a computing system, cause the computing system to:

establish an upper upper medium access controller (UMAC) and a plurality of lower UMACs;

discover the upper UMAC by each of the plurality of lower UMACs;

connect a station (STA) actor to each of the plurality of lower UMACs;

connect each of the plurality of lower UMACs to the upper UMAC; and establish a connection through the upper UMAC and each of the plurality of lower UMACs to the STA actor; and wherein each of the plurality of lower UMACs can retire MAC Protocol Data Units (MPDUs) from a transmit queue after one or more of: (a) a MAC Service Data Unit expiry limit is reached; (b) a block acknowledgement received directly from the STA actor indicates success; or (c) a starting sequence number (SSN) and MPDU bitmap received via another lower UMAC of the plurality of lower UMACs indicates success.

* * * * *